June 21, 1932.  E. BERNLÖHR  1,864,401
MACHINE FOR DIVIDING AND WORKING DOUGH
Filed Jan. 29, 1931  2 Sheets-Sheet 1
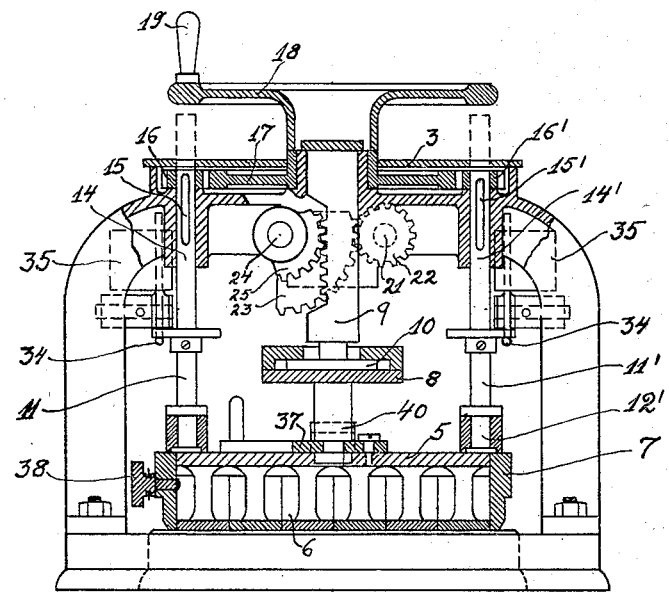
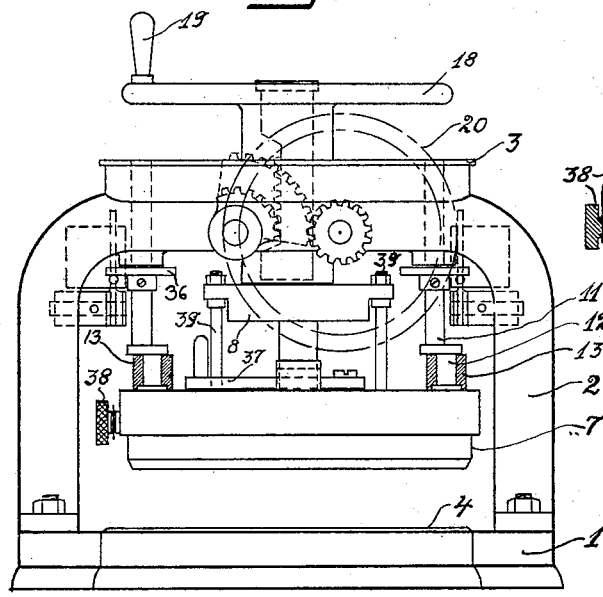
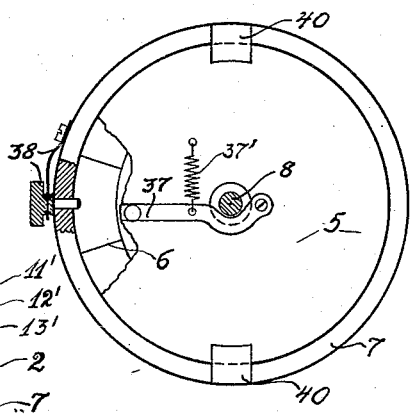
Inventor
*Eugen Bernlöhr*

June 21, 1932.  E. BERNLÖHR  1,864,401
MACHINE FOR DIVIDING AND WORKING DOUGH
Filed Jan. 29, 1931   2 Sheets-Sheet 2
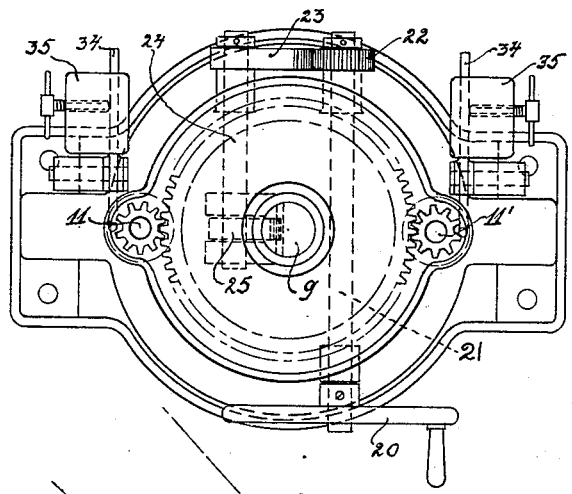
*Fig. 3.*
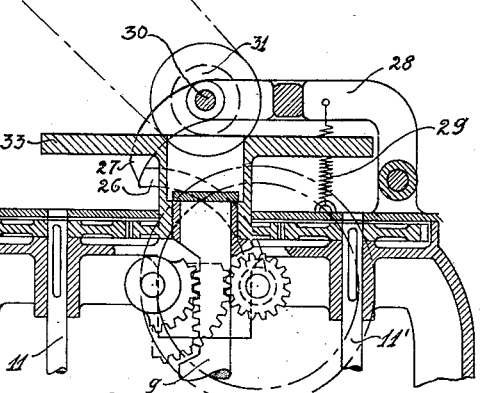
*Fig. 5.*
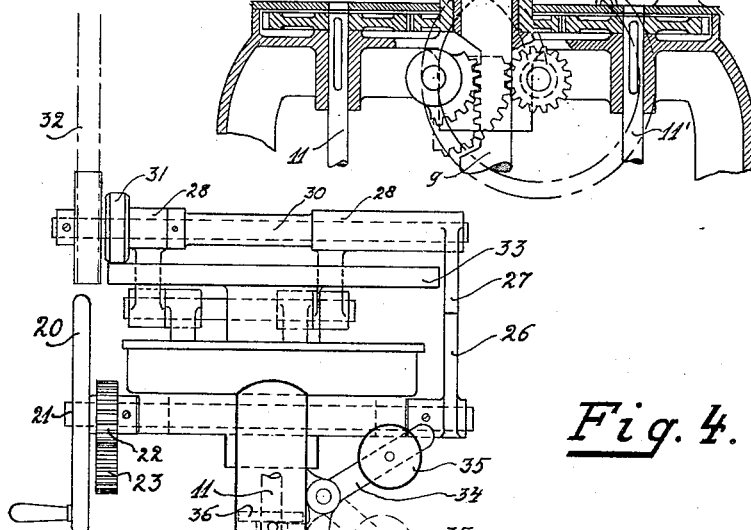
*Fig. 4.*
Inventor
*Eugen Bernlöhr.*
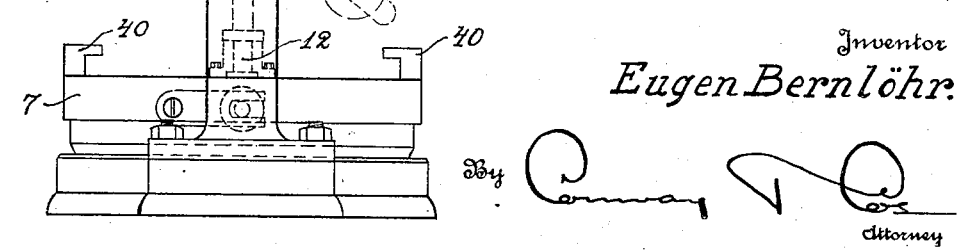
Attorney Patented June 21, 1932

1,864,401

UNITED STATES PATENT OFFICE

EUGEN BERNLÖHR, OF DOLAU/HALLE, GERMANY

MACHINE FOR DIVIDING AND WORKING DOUGH

Application filed January 29, 1931, Serial No. 512,159, and in Germany January 27, 1930.

This invention relates to a machine for dividing and working dough and more particularly to a machine provided with compartments in the head.

The object of the invention is a machine as simple as possible in construction and the performance of which not only attains but even exceeds that on the machines already well-known, while at the same time operation is simplified and the cost of manufacture is reduced. The machine designed according to the invention is particularly suited for hand-operation.

The invention consists in that the drive controlling the working movements directly acts upon the dividing and working head of the machine, preferably by means of two crank shafts or the like which are displaceable in a vertical direction within the frame of the machine and at the same time are intended for guiding the dividing and working head which is suspended in the machine frame in the usual way and is susceptible of being raised and lowered. Preferably the drive of the two crank shafts and the raising and lowering movements of the dividing and working head respectively are each accomplished by a hand wheel. The subject matter of the invention is shown by way of example in the accompanying drawings in which Fig. 1 shows a front elevation of the machine in which the dividing and working head occupies its highest position, Fig. 2 shows the same machine partially in section with its dividing and working head occupying the lowest position.

Fig. 3 is a top plan view of the same machine.

Fig. 4 is an end view showing means used for equilibrating the weight of the pressing plate.

Figure 5 is a sectional view showing the use of a roller and friction disc as driving means.

Figure 6 is a plan view, partially in section, showing the means for removably connecting the pressing plate, the dividing knives and the ring.

Upon the table (underframe) 1 of the machine is bolted a supporting frame 2 with a lid 3. During operation a dough carrying plate 4 is placed as usually on the table 1.

Above the table 1 is arranged the pressing plate 5 provided with a set of dividing knives 6 and the ring 7 enclosing the two items referred to. The pressing plate 5 and the set of dividing knives 6 are connected to each other in the usual way, for instance by a latch. Such a latch arrangement has been illustrated in Fig. 6. The pressing plate 5 has pivotally mounted thereon a coupling latch or lever 37 which is normally caused to engage against the knife head shaft 8 because of the spring 37'. The knife head shaft is provided with a horizontal groove which is engaged by the coupling lever to connect the plate 5 to the knife head shaft 8. The parts are disengaged by manually operating the coupling lever 37 against action of the spring 37' to remove the lever from the groove. The set of knives is connected to the knife head 8 in a well-known manner. As is shown in Fig. 1, this is accomplished by four adjustable bolts 39, called knife holders. Above the knife head is arranged a rack 9 displaceable in a vertical direction and the lower part of which is provided with a flange 10 revolubly mounted in a hallowspace of the knife head 8 which space is closed by a cover. Since the knife head 8 is connected to the dividing knives 6 by the knife holders 39, downward vertical movement of the rack 9, which is connected with the knife head 8, will result in a lowering of the dividing knives 6 and also of the press plate 5 which is coupled with the latter.

In the machine frame are guided two revolving guiding rods 11 and 11' for the dividing and working head the crank pins 12 and 12' of which rods are mounted in bosses 13 and 13' of the pressing plate 5 where they are secured by set collars. The rods 11, 11' are provided with grooves 14, 14' which engage with the flat keys 15, 15' of the wheels 16, 16' along which keys the rods may slide in a vertical direction, while a rotary movement is imparted to them by the wheels 16, 16' whereby the revolving movements of the whole dividing and working head are produced. The wheels 16, 16' are mounted in the frame 2 and mesh with the wheel 17 also mounted on the frame 2 to be driven manually by means of the hand wheel 18 provided with a crank 19.

The dividing and working head is raised and lowered by another hand wheel 20 which is operatively connected to the rack 9 by the transmission members 21, 22, 23, 24, 25, the teeth of the gear segment 25 meshing with the teeth on the rack 9.

After the carrying plate 4 with a lump of dough has been placed on the table 1, the enclosing ring 7 is lowered by pulling out the spring pressed knob bolt 38 (see Fig. 6) which is slidably mounted in an aperture in the ring 7 to engage a dent in the dividing knives 6 so that said ring 7 encloses the lump of dough. The ring 7 is provided with catch angles 40 which extend upwardly therefrom. These catch angles only permit the ring 7 to fall a short distance. By the hand wheel 20 being turned the rack 9 with the working head 8 is also lowered which results in the dough being pressed by the pressing plate 5. After the pressing operation is completed the coupling lever 37 is disengaged from the groove in the cutting head shaft as heretofore described, so as to release the knife head 6 from the pressing plate 5. Thus when the hand wheel 20 continues to be turned the pressing plate 5 remains in its position while the set of knives 6 descends and cuts through the pressed dough. As soon as the set of knives comes into contact with the carrying plate below, it is coupled again to the ring 7 in the well-known way. This is accomplished by the spring pressed knob bolt 38 which again engages the dent in the dividing knives 6. Hereafter the dividing and working head is imparted a rotary movement by the hand wheel 18 being turned, which results in the knife head 8 revolving around the flange 10 of the rack 9. The rotary (working) movements having been discontinued the parts of the machine are brought back into their initial position by the hand wheel 20 being turned.

The weight of the upper pressing plate 5 is equilibrated and room for the worked pieces of dough is provided for respectively by the lever 34 with an adjustable counterweight 35 and disks 36 which are in engagement with the guiding rods 11, 11'.

Fig. 4 shows these means 34 to 36 as applied to a machine in which the revolving guiding rods 11, 11' are driven by a belt 32, a roller 31 and a friction disk 33 which is fastened to the shaft of the toothed wheel 17. The axle 30 of the roller 31 is mounted on a rocking lever 28 having an end engaging portion 27 and controlled by a cam disk 26. This cam disc 26 is connected with the shaft of the hand wheel 20. When the hand wheel is turned the disc 26 follows its movement. The disc is adapted to engage the end engaging portion 27 of the rocking lever 28. When the hand wheel 20 is turned to lower the dividing knives until the latter reach the plate 4, the disc 26 has been turned so that the end engaging portion 27 of the lever 28 slides off from it. This lowers the spring tensioned lever 28 so that the roller 31 engages the friction disc 33 to thereby start the kneading movement.

When the kneading process is completed, or when it is desired to raise the working head before the kneading is completed, the hand wheel is turned in the opposite direction and the disc 26 again engages the end engaging portion 27 of the lever 28. The lever 28 is thereby raised and the roller 31 is separated from the friction disc 33.

The machine designed according to the invention distinguishes itself by its particularly simple design; on account of the small number of driving elements the machine has a low weight so that it does not require a foundation but may be placed on a table. The construction of the machine has also been simplified by the small number of the driving elements.

By the fact that the drive of the machine is accomplished by a hand wheel the long pressure lever usually used in the well-known machine and which substantially projects beyond the machine and increases the floor space required for the latter has been obviated. A mild pressure of the pressing parts is rendered possible by the hand wheel being slightly turned. In this way the risk of some parts being overstressed or broken is thus avoided, whereas in machines provided with a long pressure lever such parts are often overstressed. For small baker shops with narrow working rooms the economy in space is of paramount importance.

What I claim and want to secure by Letters Patent is:—

1. A machine for dividing and working dough comprising a frame, a dividing and working head including means for dividing and pressing the dough, vertical rods slidably and rotatably mounted in the frame, said rods having crank pins mounted thereon connected to the dividing and working head, means for rotating said rods to impart a gyratory movement to said dividing and working head, a rack bar mounted in said frame and connected at its lower end to said dividing and working head between said crank pins, and means for raising or lowering said rack bar to raise or lower the dividing and working head.

2. A machine for dividing and working dough comprising, a frame, a dividing and working head including means for dividing and pressing the dough, vertical rods slidably and rotatably mounted in the frame, said rods having crank pins mounted thereon connected to the dividing and working head, means for rotating said rods to impart a gyratory movement to said dividing and working head, a rack bar mounted in said frame and connected at its lower end to said dividing and working head between said crank pins, and means for raising or lowering said rack bar to raise or lower the dividing and working head, the connection between the rack bar and the dividing and working head including means to permit the gyratory motion imparted to the dividing and working head to continue while the said dividing and working head is raised or lowered.

3. A machine for dividing and working dough comprising, a dividing and working head, said head comprised of an upper pressing plate and a set of knives detachably secured thereto, said set of knives forming a number of compartments in the head, means for imparting a gyratory movement to said dividing and working head, said means comprising a pair of rotatably and vertically movable rods connected to the dividing and working head by crank pins, means positioned between said first named means for raising said dividing and working head and for lowering said (dividing and working) head to cause the pressing plate to press dough positioned therebelow, and to further lower the set of dividing knives to divide the pressed dough, and means for equilibrating the weight of the pressing plate to compensate for the rising of the dough during working, said raising and lowering means and said equilibrating means being operable when the dividing and working head is performing its gyratory movement.

In testimony whereof I have affixed my signature.

EUGEN BERNLÖHR.